(12) United States Patent
Schiffbauer (10) Patent No.: US 12,187,464 B2
(45) Date of Patent: Jan. 7, 2025

(54) NANOSTRUCTURED SURFACE PLASMONIC RESONANCE/PHOTOTHERMAL ABSORBING THRUSTERS

(71) Applicant: Schiffbauer Technologies, Ltd., Grand Junction, CO (US)

(72) Inventor: Jarrod Schiffbauer, Grand Junction, CO (US)

(73) Assignee: Schiffbauer Technologies, Ltd., Grand Junction, CO (US)

( * ) Notice: Subject to any disclaimer, the term of this patent is extended or adjusted under 35 U.S.C. 154(b) by 278 days.

(21) Appl. No.: 17/933,543

(22) Filed: Sep. 20, 2022

(65) Prior Publication Data
US 2023/0089542 A1    Mar. 23, 2023

Related U.S. Application Data (60) Provisional application No. 63/246,110, filed on Sep. 20, 2021.

(51) Int. Cl.
*B64G 1/40* (2006.01)

(52) U.S. Cl.
CPC ................... *B64G 1/405* (2013.01)

(58) Field of Classification Search
None
See application file for complete search history.

(56) References Cited

U.S. PATENT DOCUMENTS

| | | | | |
|---|---|---|---|---|
| 4,781,018 A | * | 11/1988 | Shoji ..................... | F03H 99/00 244/171.1 |
| 5,089,055 A | * | 2/1992 | Nakamura .............. | F24S 23/12 136/246 |
| 5,138,832 A | * | 8/1992 | Pande .................... | B64G 1/401 165/907 |
| 5,459,996 A | * | 10/1995 | Malloy, III ............ | B64G 1/409 60/200.1 |
| 6,311,476 B1 | * | 11/2001 | Frye ...................... | B64G 1/411 60/203.1 |
| 6,343,464 B1 | * | 2/2002 | Westerman ............. | F24S 20/20 60/641.15 |
| 6,421,998 B1 | * | 7/2002 | Frye ...................... | B64G 1/401 60/203.1 |
| 7,939,811 B2 | * | 5/2011 | Thundat .............. | B01L 3/50273 250/428 |
| 2002/0139107 A1 | * | 10/2002 | Miller ..................... | F24S 20/20 60/203.1 |

* cited by examiner

*Primary Examiner* — Arun Goyal
*Assistant Examiner* — William L Breazeal
(74) *Attorney, Agent, or Firm* — Cozen O'Connor (57) ABSTRACT

A mass propelled device is described. The mass propelled device includes an evaporation chamber. The evaporation chamber has at least one transparent substrate configured to receive light on a first surface and a plurality of nanostructures disposed on a second surface opposite the first surface. The plurality of nanostructures excite electrons in response to light being provided to the first surface. The mass propelled device also includes propellent storage to store propellent and a propellent delivery system to provide propellent from the propellent storage component to the evaporation chamber. The evaporation chamber is configured to heat the propellent using electrons. The mass propelled device also includes at least one nozzle configured to exhaust heated propellent from the evaporation chamber in order to produce thrust.

20 Claims, 6 Drawing Sheets

NANOSTRUCTURED SURFACE PLASMONIC RESONANCE/PHOTOTHERMAL ABSORBING THRUSTERS

CROSS-REFERENCE

This patent application claims priority from U.S. Provisional Patent Application No. 63/246,110, filed Sep. 20, 2021, the disclosure of which is incorporated by reference herein in its entirety.

BACKGROUND

Various embodiments relate generally to nanoscale propulsion systems, methods, and devices and, more specifically, relate to surface plasmonic resonance and photothermal absorption (SPR/PA)-based propulsion mechanisms.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

A Hall-effect thruster is a type of ion thruster in which a propellant is accelerated by an electric field. Such thrusters ionize propellant and accelerate the ions to produce thrust. Compared to chemical rockets, the thrust is very small. This limited thrust is impacted by available power, efficiency, and specific impulse.

Surface plasmonic resonance (SPR) is a well-known phenomenon in which the conduction electrons at a metal-dielectric interface are locked in a resonant oscillation with an external electromagnetic wave, typically in the infrared/near-infrared portion of the spectrum. Photothermal absorption (PA) is a more general term for radiative absorption that re-releases the energy as heat, concerning processes in both insulators and conductors.

What is needed is a way to improve thruster design using SPR and/or PA.

SUMMARY

The below summary is merely representative and non-limiting.

The above problems are overcome, and other advantages may be realized, by the use of the embodiments.

In a first aspect, an embodiment provides a surface plasmonic resonance or photothermal absorption (SPR/PA) evaporation chamber. The SPR/PA evaporation chamber includes at least one transparent substrate configured to receive light on a first surface and a plurality of nanostructures disposed on a second surface opposite the first surface. The plurality of nanostructures configured to excite conduction electrons in response to light. The SPR/PA evaporation chamber also includes an inlet configured to provide cold propellent to the nanostructures, and an outlet configured to expel propellent heated by the conduction electrons. The evaporation chamber or chamber housing may also include an opaque cover or variable opacity/transparency cover to control/eliminate incoming light.

Another non-limiting embodiment provides an ion propelled device. The ion propelled device includes an evaporation chamber. The evaporation chamber has at least one transparent substrate configured to receive light on a first surface and a plurality of nanostructures disposed on a second surface opposite the first surface. The plurality of nanostructures excite conduction electrons in response to light being provided to the first surface. The ion propelled device also includes propellent storage to store propellent and a propellent delivery system to provide propellent from the propellent storage component to the evaporation chamber. The evaporation chamber is configured to heat the propellent using conduction electrons. The ion propelled device also includes at least one nozzle configured to exhaust heated propellent from the evaporation chamber in order to produce thrust.

BRIEF DESCRIPTION OF THE DRAWINGS

Aspects of the described embodiments are more evident in the following description, when read in conjunction with the attached Figures.

DETAILED DESCRIPTION

Various embodiments provide a propulsion mechanism based on a nanoscale interfacial phenomenon, surface plasmonic resonance/photothermal absorption (SPR/PA). These SPR/PA propulsion devices are a cost-effective alternative to Hall effect Solar-Electric Propulsion (SEP) and may be used for Asteroid Retrieval and Redirect Missions (ARRM). Using both SPR/PA in metallic nanostructures and solar-thermal conversion in graphene can achieve highly efficient (60-80%) radiative-to-thermal energy transfer.

While SPR/PA thruster technology is relatively unexplored, the fundamental SPR/PA and SPR/PA-driven heat transfer phenomena are currently subject of active study in areas as diverse as advanced photothermal therapeutics, photocatalysis, and solar-thermal water desalination. Recent results demonstrating the high-speed ballistic Brownian motion of metal nanoparticles (NPs) through surrounding liquid via a Leidenfrost-like plasmonic 'supercavitation', indicate the potential advantages of using SPR/PA to generate thrust. The SPR/PA effect in the NPs results in the generation of high heat flux at the curved NP surface, which tends to suppress bubble formation through dissipation at lower temperatures and results in a hot, high pressure vapor bubble formation at high temperature. While the cavitating NP geometry is not conducive to a typical thruster configuration, other nanostructures such as nanocone arrays and carbon-based structures such as graphene exhibit SPR/PA, which can also be chemically treated and/or "doped" with metallic NPs to improve heat-transfer and explosive boiling responses.

Figure 1:
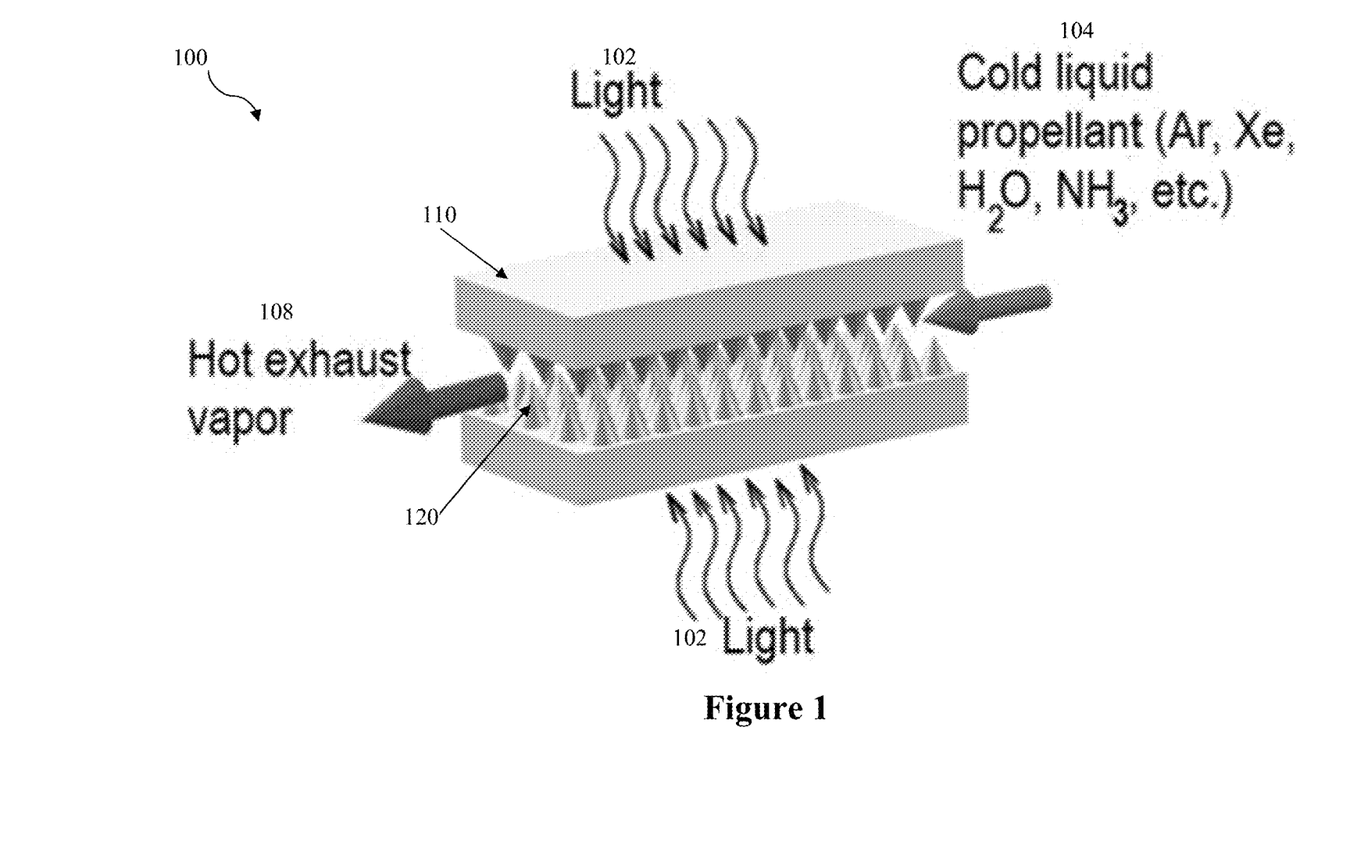
FIG. 1 shows a schematic of a primary heat exchange/boiler for a SPR/PA effect thermal thruster.

FIG. 1 shows a schematic of a primary heat exchange/boiler 100 for a SPR/PA effect thermal thruster. Incident near-infrared/infrared radiation (light) 102 is transmitted through the transparent substrate 110 and excites electrons at the surface of the nanostructures 120. The motion of the electrons results in a high surface temperature and the rapid formation of vapor 108 in a variety of cold liquid propellants 104, such as, Ar, Xe, $H_2O$, $NH_3$, etc.

SPR/PA working structures 120 may be on the order of ~100 nm to ~1 micron and can be assembled on a variety of surfaces. One non-limiting embodiment is a thruster configuration having a planar/layered (see FIG. 1) and another embodiment uses a concentric cylindrical/spheroidal assembly of transparent substrates coated with SPR/PA-active nanostructures (see FIG. 2). At the smallest size, an individual element could even be microfluidic, e.g., a "thruster-on-a-chip."

Graphene-based and other carbon-based evaporators function well under concentrated light and for metal plasmonic nanostructures, while the situation is more complicated, this is still applies. Thus, a reflector/concentrator can be employed to focus light onto an evaporation chamber (see FIG. 2, for example). For a reflector with 100 $m^2$ area, the total available power per unit varies from 140 kW (near Earth) to around 50 kW (~Mars orbit.)

For an effective collector-to-reflector area ratio of at least 1/10—which is at the low end—the conversion efficiency may approach 80%, not accounting for absorption and scattering from the evaporator chamber optics. The total available wattage per thrust unit can range from 40-112 kW. Thus, there is considerably more power available to the evaporator chamber than a comparable solar-electric propulsion Hall effect architecture.

Assuming a ~100 kPa pressure inside the chamber at about T=300K and an exit nozzle of radius 0.01 m, the available maximum thrust is around 30N for water vapor. Maintaining temperature and pressure for a range around these values is feasible, given the available power. A quick estimate of specific impulse as $S.I. \sim F_{thrust}/M_{evap}=F_{thrust}/TA_E=3.3\times10^4$ s. Here, the mass-loss rate is G=0.00075 $kg/m^2 \cdot s$ and the effective evaporator area is taken as 0.124 $m^2$ for an approximately spherical collector of radius r=0.1 m. Based on these simple estimates, the device has the potential to outperform SEP at orders of magnitude lower fuel costs.

To obtain a rough estimate of the power output of such a thruster, we make several simplifications about the fluid and overall hydrodynamics. These simplifications include assuming an ideal, incompressible fluid with a density of saturated water vapor (at the internal operating state) and that the energy balance can be accounted for without any change of state or density of the fluid. The contributions are the pressure drop (which can include viscous dissipation in the nozzle phenomenologically), a difference between internal and external temperature, and kinetic energy of the exhaust, e.g., there is only a change in temperature of the fluid. While these assumptions may not determine the power output of such a device accurately, they are sufficient to obtain an order of magnitude estimate for the maximum possible exhaust velocity at operating conditions.

In this case, the energy balance yields a modified Bernoulli-like equation for the exhaust velocity, $v_{exhaust} \sim \sqrt{-2\Delta/\rho - 3m_{mol}\Delta T/N_A}$. Here, the pressure gradient and temperature gradients are between the chamber and exterior; the mass density, $\rho$, is of saturated vapor at the internal state; $m_{mol}$ is the molecular mass; and $N_A$ Avogadro's number. At the maximum thrust at given operating temperature and pressure, this corresponds to a maximum output power of about 100 kW. For reduced thrust (e.g., smaller exhaust nozzle), the system can generate auxiliary power to spare as far out as Mars. This helps to reduce overall mass as the system can generate its own heat and electricity.

The conversion efficiency and mass loss rates have been evaluated at ambient laboratory pressures and temperatures, assuming evaporation from a curved liquid-vapor interface for deionized (DI) water. These numbers provide an estimate of thrust and specific impulse. If SPR/PA boiling is allowed for, which can be incorporated into the device by several possible routes, it should be possible to generate more thrust. However, a more sophisticated computational approach, similar to Schiffbauer and Luo, may be used for this type of calculation. Such calculations can be extended to more relevant geometries and a variety of boiling/evaporating interfaces and adapted for various working fluids.

There are several possible thruster embodiments with different overall geometries, and a range of possible nanomaterials and nanomaterial composites can be selected.

With propellants such as ammonia or water, there are fewer technical difficulties associated with fuel storage and transfer than cryogenics, and therefore greater freedom in design.

Choice of nanomaterial, substrate, and propellant will influence overall design and performance. While SPR/PA efficiency is less likely to be affected by radiation than photoelectric conversion, radiation-induced damage and nanosurface degradation remain an issue in implementation of engineered nanomaterials/super-surfaces for aerospace applications.

Thruster design: Basic designs may use variations in planar vs. concentric geometry and representative evaporator surfaces consisting of chemically treated graphene or chemically treated graphene with nanoparticle doping (both on glass.) and/or other porous photothermally absorbing structures.

Figure 2:
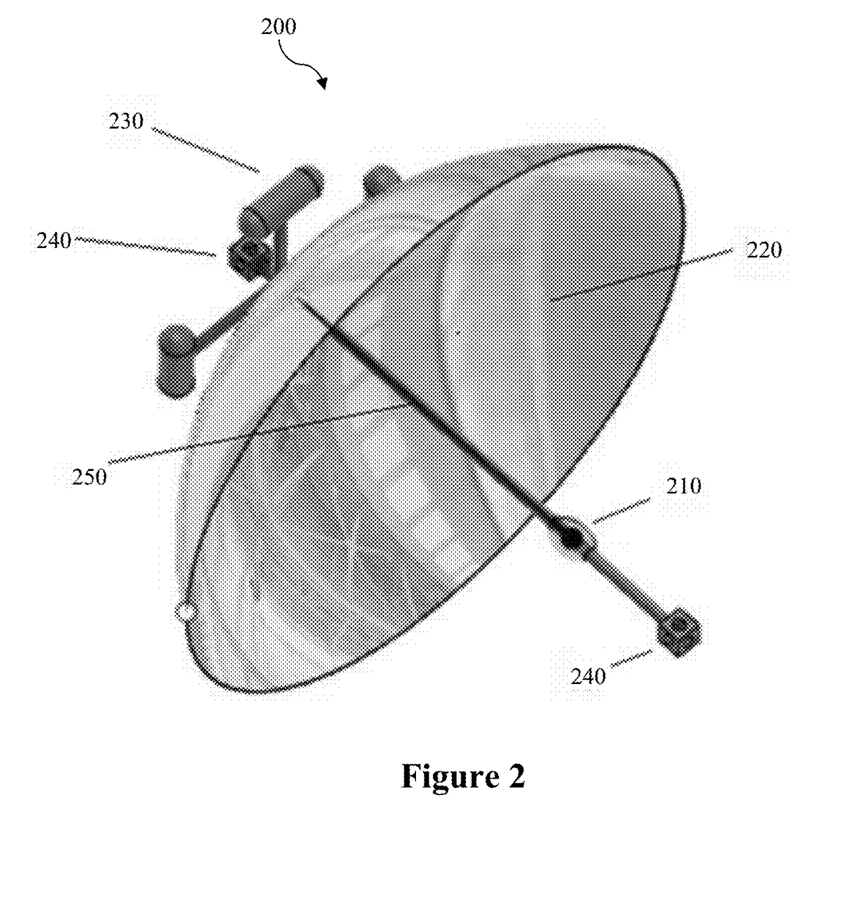
FIG. 2 is an illustration of a thruster unit.

FIG. 2 is an illustration of a thruster unit 200. The reflector 220 maintains solar alignment and is actuated by ports at ends of a pressurized evaporation chamber to provide delta-v and maneuvering thrust. The solar SPR/PA thrust system 200 is configured for an Asteroid Redirect Vehicle (ARV) or similar cargo maneuvering (space debris cleanup, LEO-lunar hauling, etc.). Variations on the arrangement of components are possible without altering the essential function.

The SPR/PA 210 is housed directly in an optically transparent evaporation chamber, or alternatively in an opaque evaporation chamber with light introduced by use of fiber optics or other light-piping. In both cases, the light input port is located around the focus of the solar concentrator 220. Light is gathered by a reflector/concentrator 220 which is configured to work with solar light or other intense light source (e.g., powered by lasers, or indirect concentrated solar light).

Propellant storage devices 230 may be located on the thruster unit 200. The design and placement of the propellant storage 230 may depend on the propellant as well as overall geometry. Aqueous propellant, ammonia, or methane in addition to noble (xenon, etc.) or any other easily evaporated propellant can function with the SPR/PA.

While prone to freezing, aqueous, ammonia, or methane-based propellants, in addition to being low-cost propellants, also may utilize lower-cost stock valves, ports, pumps, etc. Aqueous propellants may also be protected by use of suspended nanoparticles and/or antifreeze proteins or operate with solar input/alternative placement.

Propellant delivery may be accomplished via pumping, capillary effects, and/or via thermally-induced flows due to overall temperature gradients occurring naturally between the dark and light sides of the device. It is also possible to use multi-phase propellant storage, e.g., solid storage on the cold side in a container of variable volume, extraction through melting phase change and delivery through thermal convection/pressure and capillary effects.

The thrusters 240 use a multi-port design and are located on both ends of ARM system 200. Other configurations are possible for other implementations (e.g., thruster on a chip configuration for cubesats, steerable ports for orbital maintenance/station-keeping, etc.).

The system 200 also uses a hot and cold propellant/thrust delivery 250. This uses a concentric design.

In further embodiments, auxiliary power generation may be integrated into this system 200. The power generation system (not shown) may be either thermoelectric, steam/vapor-driven (off thrust stream.) or using separate solar input (e.g., Stirling engine design.) SPR/PA effect may be utilized in heat exchanger of solar driven Stirling engines to increase efficiency or directly as steam generation units. Power may be developed by diverting some exhaust from the same evaporator as the thruster or built as a separate SPR/PA-driven unit. For back-up/operation outside of direct or sufficient sunlight, laser or other concentrated light can be used, driven from electricity in a storage battery.

Additional elements may also be included, for example, mechanical retrieval apparatus (arms, drill, etc.). For example, multiple, and/or smaller reflectors and thrusters arrayed on a frame could be used in conjunction rather than a large, central reflector and thrust unit, and other mission-specific equipment attached to this frame.

In an ARRM mission context, a medium-large modular thruster architecture may be used with individual thrust units combining delta-v and maneuvering thrust ports in an arrangement like that shown in FIG. 2. Forward and reverse-thrust ports, side ports, and variety of mechanical and optical solutions can be employed to optimize thrust direction with respect to the Sun, and multiple units may be combined into an array to enable effective manipulation of the asteroid. The architecture pictured in FIG. 2 is also one of several designs for a modular thrust Asteroid Redirect Vehicle (ARV).

Other configurations than that pictured are possible, and fiber optics or other optics, and/or mechanical arrangements, could be employed to achieve these. However, in addition to control electronics and mechanical devices, such ARV architectures can share basic elements: (1) a reflector/concentrator (or other source of high-intensity infrared-optical radiation,) (2) the nanostructured evaporator chamber, (3) fuel storage and delivery, (4) vapor delivery and pressure/thrust control, and (5) thrust ports. The solar concentrator and related structures could feature similar mechanical constraints as the solar arrays in SEP Hall ARVs.

SPR/PA technology has previously been suggested for desalination and water remediation, as it is relatively insensitive to small quantities of contaminants. Thus, water (e.g., from lunar ice) can be used as a propellant with relatively little processing. An onboard system could be fed ice and perform on-board filtration. This stands in contrast to current LOX/LH2 technology, which uses more processing, electrolysis, and costlier propellant storage.

Overall, various embodiments represent an improvement in non-chemical propulsion with the capability to radically transform space exploration and commercialization through massive reductions in propellant cost concurrent with increases in efficiency, possible reduction in weight of components, and significant cross-cutting impacts on other research areas and applications.

Figure 3:
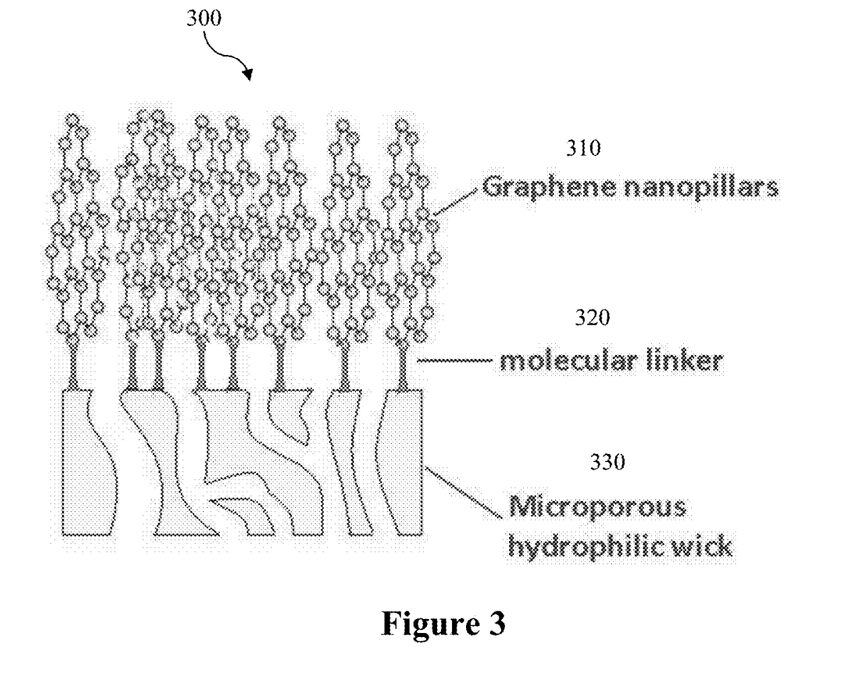
FIG. 3 illustrates an example of an alternate SPR/PA/solar evaporator structure.

FIG. 3 illustrates an example of an alternate SPR/PA/solar evaporator structure 300. The illustration shows graphene 310 attached, via a molecular linker 320, to a hydrophilic wick 330, which may be of $SiO_2$ and have some degree of optical transparency. Alternative arrangements include graphene oxide, chemically reduced graphene oxide, and molecularly functionalized GO, CrGO, porous carbon foams and/or other carbon-based solar concentrator/evaporator, or chemically distinct, but physically similar arrangements with boron nitride-based nanostructures.

Alternatively, the structure may be directly attached to transparent or opaque evaporator walls, depending on whether light delivery is primarily through the top of the structure, or through the backside of the nanomaterial. Additionally, metallic and/or functionalized metallic nanoparticles may be employed along with/embedded in the same matrix as graphene/graphene derivatives or other non-metallic nanostructure to increase efficiency and overall performance. Bonding efficacy, capillary, and thermal properties may be improved through thermal or other radiative annealing and/or chemical functionalization of the surfaces. Similar concentrator structures may be employed in light-driven heat exchange for Stirring engines or turbine-driven systems for highly efficient light-to-electric generation, e.g., as in an integrated auxiliary power system for the SPR/PA-ARM, or potentially in flow-through photocatalytic reactors.

Figure 4:
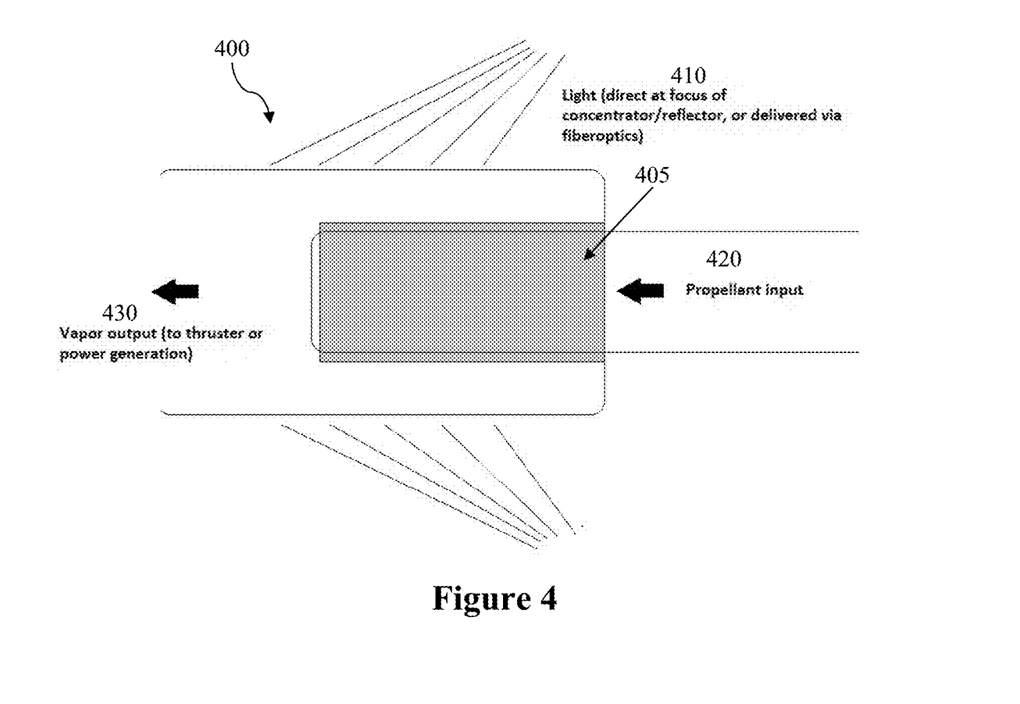
FIG. 4 is a schematic of a non-limiting embodiment of a concentric evaporator for a circular/parabolic reflector/concentrator.

FIG. 4 is a schematic of a non-limiting embodiment of a concentric evaporator design 400 for circular/parabolic reflector/concentrator with an evaporator positioned about the focus. The concentric design need not be circular; elliptical, (chamfered or rounded) rectangular, or other designs with central propellant delivery are possible. In these, either metal plasmonic arrays (cones, rods, spheres, or lower-symmetry nanostructures) may be deposited directly, or in conjunction with graphene/graphene derivatives/carbon structure or other nanostructured non-metallic absorbers, onto the evaporator surface.

The nanostructured SPR/PA/evaporator material 405 is indicated in grey, where the propellant delivery is through the backside and light delivery through the front. The propellant input 240 may be through an opaque delivery pipe with pores or slits to deliver propellant to the evaporator, or through a porous wicking structure (for example, see FIG. 3). Light delivery 410 may be accomplished directly, via a transparent evaporation chamber, via fiber optics/light pipe system, or, for non-solar driven operation, laser or other artificial light may be used. Pressure control in such designs achieved by use of stock valve technology between the evaporator and thrust port 430.

Figure 5A:
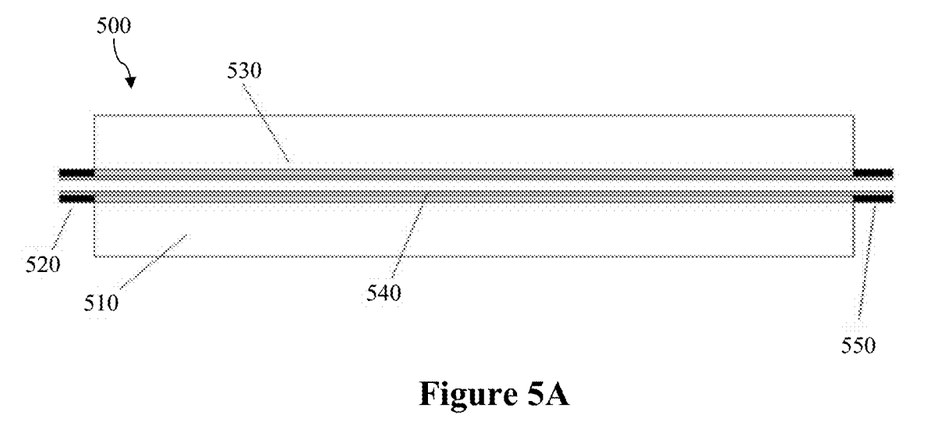
FIGS. 5A and 5B, collectively referred to as FIG. 5, show a planar thruster.
Figure 5B:
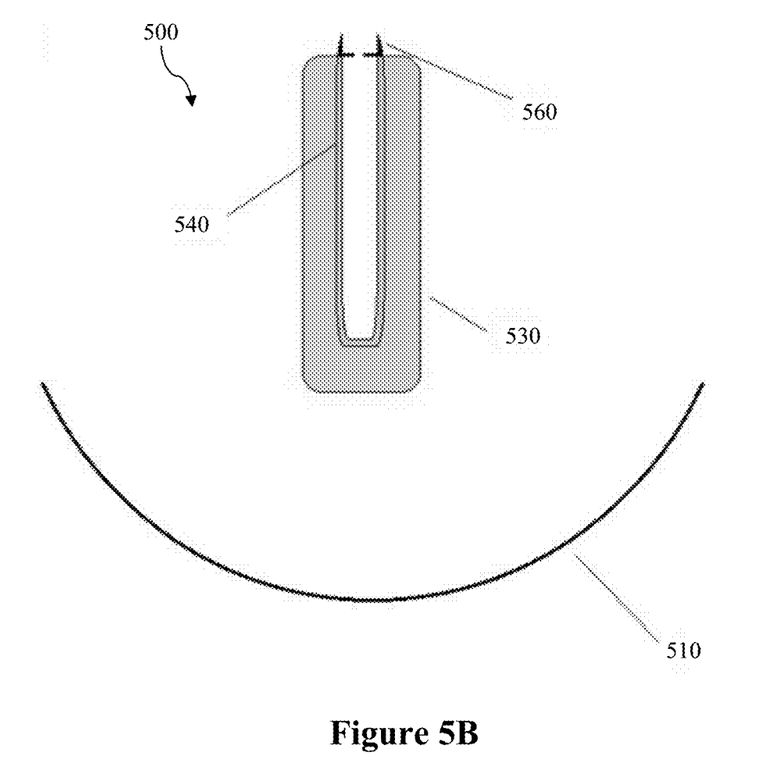

FIGS. 5A and 5B, collectively referred to as FIG. 5, show a planar thruster 500 in both a top-view (FIG. 5A) and side-view (FIG. 5B). The planar thruster 500 has a transparent evaporator 530 and attached nanomaterials 540 such as pictured in FIG. 1 with light delivery to the backside of the nanostructured materials. The planar thruster 500 also includes a trough-type reflector/concentrator 510. Flow may be unidirectional, with an input flow 520 directed to thrust/power generation 550, or input can be provided from both directions (or the bottom/back, similar to FIG. 2.)

FIG. 5B also indicates a possible arrangement for direct placement of a stock nozzle and valve at the rear of the chamber 560. A series of such nozzles with independent valves along the length of the evaporator can achieve effective pressure and thrust control. Steering and valves are not shown in any detail.

In a further non-limiting embodiment, the nanomaterials are placed along a central substrate with propellant delivered outward similar to FIG. 1. Central propellant delivery may be used for larger volume thrusters, and flow-over delivery for smaller volume devices.

Additionally, fiber optic delivery can be implemented with either thruster design in lieu of a reflector/concentrator having the evaporator about the focus.

Figure 6A:
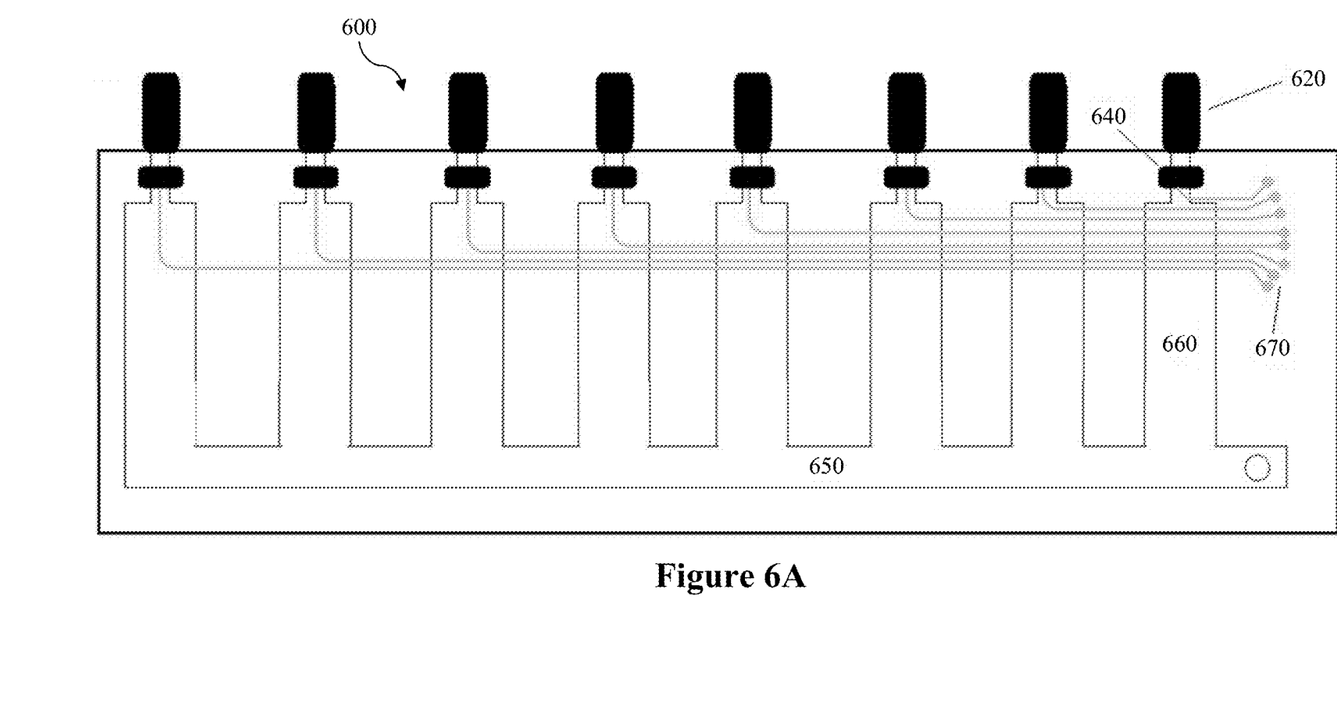
FIGS. 6A and 6B, collectively referred to as FIG. 6, show a schematic for a SPR/PA "thruster-on-a-chip" array.
Figure 6B:
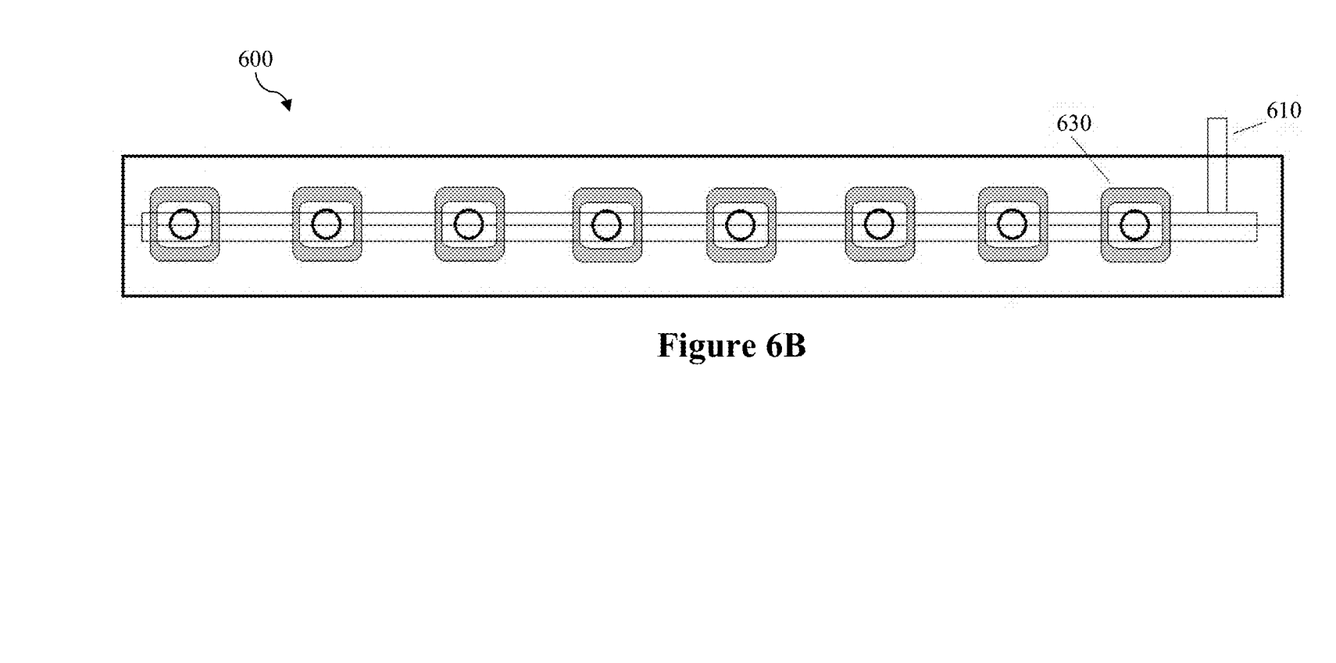

FIGS. 6A and 6B, collectively referred to as FIG. 6, show a schematic for a SPR/PA "thruster-on-a-chip" array 600. FIG. 6A is a top-down view and FIG. 6B is a side view. The array 600 is compatible with fabrication by standard photolithography and bonding techniques. Propellant inlet port(s) 610 are connected to external (liquid-phase) propellant. One or more thrusters 620 and evaporation chambers 640 may be configured and distributed off the side of the propellant manifold(s) 650 as shown. In an alternative embodiment, the thrusters 620 and evaporation chambers 640 may be distributed around a central manifold(s)).

The SPR/PA-active/absorbing nanomaterial 630 is in the evaporator chambers. Microelectromechanical systems (MEMS) valves (piezo or other stock technology) can be integrated into the chip or onto the thruster bodies. As shown, the MEMS valves are integrated on the chip, with circuit and a control bus 670 printed onto the chip itself. With this design, light may be fed into one or both flat sides.

In a further non-limiting embodiment, the nozzle is integrated into the chip with an integrated MEMS valve and/or controllable opacity cover.

The configuration shown above can be used with trough-like reflector; alternatively, designs with thrusters distributed around 2-3 sides of manifold can be used with both types of reflectors. Either arrangement is compatible with fiber-optic or other indirect light delivery (including non-solar sources). Chip dimensions can be ~25 mm×50 mm or similar, but overall design is scalable and modular. Chamber depths are on the range of 10's to 100's of um.

In further embodiments, other nanomaterials/composites may be used. These include metallic structures with at least 1 nanometer dimension (which are plasmonic resonant); and non-metallic radiation absorbing nanostructured materials, such as graphene, graphene oxide, or other graphene/graphene oxide derivatives including chemically reduced or functionalized graphene, or other nanostructured carbon, carbon foams, hexagonal boron nitride. Composites of one or more of these materials may also be used. Metallic nanostructures may be molecularly functionalized to enhance and tune thermal and capillary properties.

In additional embodiments, functionalization may be used based on chemical functionalization with molecules terminated with functional groups such as —COOH, —OH, or —F which enhance hydrophilicity and heat transfer, or groups such as —$CH_3$, which act to enhance contact line detachment. Mixtures of these functionalizations in mixed monolayers can be used to selectively tune interfacial properties.

In further embodiments, the system may include antifreeze protein/nanofluid enhanced aqueous fluids as candidate propellant or working fluid for thermal management: Thermal properties of aqueous (and other polar) working fluids may be augmented by addition of (functionalized) nanoparticles and freezing suppressed by use of antifreeze proteins. Outside of augmenting thermal properties of potential propellants in the above devices, antifreeze proteins dissolved in aqueous working fluid may be used in reduced weight heat pipes or other spacecraft thermal management wherein a non-toxic coolant with antifreeze properties is required.

In additional embodiments, the system may be configured to accommodate ammonia instead of water. This makes minimal change in evaporator structures, however, there may be more significant differences in the propellant storage and delivery.

In further embodiments, the system may include propellant pre-heating and delivery. For solar-driven thrust applications, the arrangement uses multiphase propellant storage, where solid propellant is kept on the cold side of the system in a variable-volume container (e.g., cylinder fitted with movable piston) and heat from the warm side liquefies the propellant. The liquid may be delivered via pumping, thermal convection, capillary action, or a combination thereof. Preheating may be accomplished by a thermally absorbing propellant conduit exposed to the sun-side of the device.

In additional embodiments, the system may us fiber-optics, light piping or lasers. Other than direct and concentrated solar radiation, light may be directed into the evaporation chamber/SPR/PA structures using fiber optics, which enables the same functional connectivity above without the placement of the evaporator at the focus and may function with a partially (or completely) non-transparent chamber.

In further embodiments, the system may have dual or alternate uses. As one non-limiting example, the flow-through wick evaporator could be used for solar desalination/water remediation, steam generation, or a photocatalytic reactor. The specifics of the reactor can be tuned by selection of the nanomaterials as well as the supplied fluid stock and the temperature and pressure regulated by the design of the evaporator. The concentric configuration or trough-flow through configuration (with inlet and outlet at opposite ends as in FIG. 5) can be connected to a dynamo via turbine or Stirling-cycle piston to generate electric power.

One non-limiting embodiment provides a surface plasmonic resonance (SPR/PA) evaporation chamber. The SPR/PA evaporation chamber includes at least one transparent substrate configured to receive light on a first surface and a plurality of nanostructures disposed on a second surface opposite the first surface. The plurality of nanostructures configured to excite electrons (such as, conduction elections) in response to light. The SPR/PA evaporation chamber also includes an inlet configured to provide cold propellant to the nanostructures, and an outlet configured to expel propellant heated by the conduction electrons.

In a further embodiment of the SPR/PA evaporation chamber above, the at least one transparent substrate is transparent to infrared light and/or near-infrared light.

In another embodiment of any one of the SPR/PA evaporation chambers above, the plurality of nanostructures are nanocones.

In a further embodiment of any one of the SPR/PA evaporation chambers above, the plurality of nanostructures are: graphene oxide, chemically reduced graphene oxide (GO), and/or molecularly functionalized GO or CrGO, and/or carbon foams.

In another embodiment of any one of the SPR/PA evaporation chambers above, the plurality of nanostructures comprises a graphene and/or carbon-based photoabsorbing structure connected to a hydrophilic wick by a molecular linker.

In a further embodiment of any one of the SPR/PA evaporation chambers above, the SPR/PA evaporation chamber also includes a cold propellant storage and delivery system configured to supply propellant to the inlet.

In another embodiment of any one of the SPR/PA evaporation chambers above, the cold propellant is one of: argon, xenon, water, methane and ammonia.

In a further embodiment of any one of the SPR/PA evaporation chambers above, the input comprises an opaque delivery pipe with pores or slits.

In another embodiment of any one of the SPR/PA evaporation chambers above, the input comprises a porous wicking structure.

In a further embodiment of any one of the SPR/PA evaporation chambers above, the SPR/PA evaporation chamber also includes fiber optic fibers configured to direct light to the first surface of the at least one transparent substrate.

In another embodiment of any one of the SPR/PA evaporation chambers above, the SPR/PA evaporation chamber also includes at least one nozzle configured to provide thrust by expelling the propellent. The SPR/PA evaporation chamber may also include microelectromechanical systems valves to control flow of propellent through the at least one nozzle.

In a further embodiment of any one of the SPR/PA evaporation chambers above, the at least one transparent substrate comprises a first transparent substrate and a second transparent substrate, wherein the first transparent substrate is opposite the second transparent substrate such that the plurality of nanostructures disposed on the first transparent substrate are in proximity to the plurality of nanostructures disposed on the second transparent substrate.

Another non-limiting embodiment provides an ion propelled device. The ion propelled device includes an evaporation chamber. The evaporation chamber has at least one transparent substrate configured to receive light on a first surface and a plurality of nanostructures disposed on a second surface opposite the first surface. The plurality of nanostructures excite electrons (such as, conduction electrons) in response to light being provided to the first surface. The ion propelled device also includes propellent storage to store propellent and a propellent delivery system to provide propellent from the propellent storage component to the evaporation chamber. The evaporation chamber is configured to heat the propellent using conduction electrons. The ion propelled device also includes at least one nozzle configured to exhaust heated propellent from the evaporation chamber in order to produce thrust.

In a further embodiment of the ion propelled device above, the light collecting element comprises a light reflect configured to focus light onto the first surface of the at least one transparent substrate.

In another embodiment of any one of the ion propelled devices above, the light collecting element includes fiber optics to transmit light onto the first surface of the at least one transparent substrate.

In a further embodiment of any one of the ion propelled devices above, the at least one nozzle is a plurality of nozzles to supply thrust in a plurality of directions.

In another embodiment of any one of the ion propelled devices above, the plurality of nanostructures are nanocones.

In a further embodiment of any one of the ion propelled devices above, the propellent is: argon, xenon, water, methane and/or ammonia.

In another embodiment of any one of the ion propelled devices above, the ion propelled devices includes microelectromechanical systems valves configured to control flow of propellent through the at least one nozzle.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A surface plasmonic resonance/photothermal absorption (SPR/PA) evaporation chamber comprising:
   at least one transparent substrate configured to receive light on a first surface;
   a plurality of nanostructures disposed on a second surface opposite the first surface, the plurality of nanostructures configured to excite electrons in response to light;
   an inlet configured to provide propellent to the plurality of nanostructures; and
   an outlet configured to expel the propellent heated by the electrons.

2. The SPR/PA evaporation chamber of claim 1, wherein the at least one transparent substrate is transparent to one of: infrared light and near-infrared light.

3. The SPR/PA evaporation chamber of claim 1, wherein the plurality of nanostructures comprises nanocones.

4. The SPR/PA evaporation chamber of claim 1, wherein the plurality of nanostructures comprises at least one of: graphene oxide, chemically reduced graphene oxide (GO), and molecularly functionalized GO or CrGO.

5. The SPR/PA evaporation chamber of claim 1, wherein the plurality of nanostructures comprises a graphene or other photoabsorbing structure connected to a hydrophilic wick by a molecular linker.

6. The SPR/PA evaporation chamber of claim 1, further comprising a propellent storage and delivery system configured to supply the propellent to the inlet.

7. The SPR/PA evaporation chamber of claim 1, wherein the propellent is one of: argon, xenon, water, methane and ammonia.

8. The SPR/PA evaporation chamber of claim 1, wherein the inlet comprises an opaque delivery pipe with pores or slits.

9. The SPR/PA evaporation chamber of claim 1, wherein the inlet comprises a porous wicking structure.

10. The SPR/PA evaporation chamber of claim 1, further comprising optical fibers configured to direct the light to the first surface of the at least one transparent substrate.

11. The SPR/PA evaporation chamber of claim 1, wherein the outlet further comprises at least one nozzle configured to provide thrust by expelling the propellent.

12. The SPR/PA evaporation chamber of claim 11, further comprising microelectromechanical systems valves configured to control flow of the propellent through the at least one nozzle.

13. The SPR/PA evaporation chamber of claim 1, wherein the at least one transparent substrate comprises a first transparent substrate and a second transparent substrate, wherein the first transparent substrate is opposite the second transparent substrate such that the plurality of nanostructures disposed on the first transparent substrate is in proximity to the plurality of nanostructures disposed on the second transparent substrate.

14. An ion propelled device comprising:
   a light collecting element configured to gather light and provide collected light;

an evaporation chamber comprising:

(i) at least one transparent substrate; and (ii) a plurality of nanostructures disposed on a second surface opposite a first surface;

a propellent storage component configured to store propellent;

a propellent delivery system configured to provide the propellent from the propellent storage component to the evaporation chamber; and at least one nozzle, wherein, the evaporation chamber is configured to receive the collected light on the first surface, the plurality of nanostructures are configured to excite conduction electrons in response to the collected light, the evaporation chamber is configured to heat the propellent using the conduction electrons thereby generating heated propellent, and the at least one nozzle is configured to exhaust the heated propellent from the evaporation chamber in order to produce thrust.

15. The ion propelled device of claim 14, wherein the light collecting element comprises a light reflector configured to focus the light onto the first surface of the at least one transparent substrate.

16. The ion propelled device of claim 14, wherein the light collecting element comprises fiber optics configured to direct the light onto the first surface of the at least one transparent substrate.

17. The ion propelled device of claim 14, wherein the at least one nozzle comprises a plurality of nozzles configured to produce thrust in a plurality of directions.

18. The ion propelled device of claim 14, wherein the plurality of nanostructures comprises nanocones.

19. The ion propelled device of claim 14, wherein the propellent is one of: argon, xenon, water, methane and ammonia.

20. The ion propelled device of claim 14, further comprising microelectromechanical systems valves configured to control a flow of the propellent through the at least one nozzle.

* * * * *